(12) United States Patent
Bergmann et al.

(10) Patent No.: US 12,548,135 B2
(45) Date of Patent: Feb. 10, 2026

(54) METHOD FOR DETECTING ANOMALIES IN IMAGES USING A PLURALITY OF MACHINE LEARNING PROGRAMS

(71) Applicant: MVTec Software GmbH, Munich (DE)

(72) Inventors: Paul Bergmann, Munich (DE); Kilian Batzner, Holzkirchen (DE); Michael Fauser, Munich (DE); David Sattlegger, Munich (DE)

( * ) Notice: Subject to any disclaimer, the term of this patent is extended or adjusted under 35 U.S.C. 154(b) by 383 days.

(21) Appl. No.: 17/579,396

(22) Filed: Jan. 19, 2022

(65) Prior Publication Data

US 2023/0073223 A1 Mar. 9, 2023

(30) Foreign Application Priority Data

Sep. 6, 2021 (EP) ..................................... 21195025

(51) Int. Cl.
*G06T 7/00* (2017.01)

(52) U.S. Cl.
CPC .. *G06T 7/0004* (2013.01); *G06T 2207/20081* (2013.01); *G06T 2207/20084* (2013.01)

(58) Field of Classification Search
CPC ......... G06T 7/0004; G06T 2207/20081; G06T 2207/20084; G06T 5/40; G06V 30/19127; G06V 10/7715; G06F 16/51; G06N 3/045; G06N 3/08
See application file for complete search history.

(56) References Cited

U.S. PATENT DOCUMENTS

| | | | |
|---|---|---|---|
| 11,216,932 B1* | 1/2022 | Checka | G06T 7/0002 |
| 11,763,086 B1* | 9/2023 | Sandu | G06N 3/045 |
| | | | 704/9 |
| 2017/0323437 A1* | 11/2017 | Takimoto | G06V 10/32 |
| 2018/0082150 A1* | 3/2018 | Itou | G06F 11/0754 |
| 2018/0260668 A1* | 9/2018 | Shen | G06V 10/82 |
| 2019/0130279 A1* | 5/2019 | Beggel | G06V 10/82 |
| 2019/0320934 A1* | 10/2019 | Odry | A61B 5/7264 |
| 2020/0076842 A1 | 3/2020 | Zhou et al. | |
| 2020/0279188 A1* | 9/2020 | Baker | G06N 3/084 |
| 2021/0271867 A1* | 9/2021 | Liu | G06N 3/0455 |
| 2022/0101508 A1* | 3/2022 | Tang | G06T 7/001 |
| 2022/0108163 A1* | 4/2022 | Sokhandan Asl | G06V 10/7753 |
| 2022/0245932 A1* | 8/2022 | Gauerhof | G06N 3/045 |
| 2023/0005251 A1* | 1/2023 | Take | G06V 10/82 |
| 2023/0011970 A1* | 1/2023 | Serra Lleti | G16B 40/20 |
| 2023/0053878 A1* | 2/2023 | Bönig | G06T 7/001 |
| 2023/0055146 A1* | 2/2023 | Wang | G06V 10/82 |
| 2023/0070008 A1* | 3/2023 | Kulon | G06T 17/00 |
| 2023/0281959 A1* | 9/2023 | Hoshen | G06N 3/045 |
| | | | 382/225 |
| 2024/0193760 A1* | 6/2024 | Fukuda | H01L 22/00 |

OTHER PUBLICATIONS

The Extended European Search Report for European Application No. 21195025.8, mailed Mar. 2, 2022 (10 pages).

(Continued)

*Primary Examiner* — Xuemei G Chen
(74) *Attorney, Agent, or Firm* — Kagan Binder PLLC

(57) ABSTRACT

This invention relates generally to machine vision systems, and more particularly, to the detection of anomalies in scenes observed by imaging sensors.

14 Claims, 5 Drawing Sheets

(56) References Cited

OTHER PUBLICATIONS

Bergmann et al., "Improving Unsupervised Defect Segmentation by Applying Structural Similarity to Autoencoders," arxiv.org, Cornell University Library, 201 Olin Library Cornell University Ithaca, NY 14853, XP081415232, 2018, (8 pages).
Bergmann et al., Improving Unsupervised Defect Segmentation by Applying Structural Similarity to Autoencoders; arXiv:1807.02011v3 [cs.CV] Feb. 1, 2019, 8 pp.
C. Wang et al., Multiscale Visual Attention Networks for Object Detection in VHR Remote Sensing Images, IEEE Geoscience and Remote Sensing Letters, vol. 16, No. 2, Feb. 2019, pp. 310-314.
Korean Office Action for co-pending application No. KR-10-2022-0081597, May 19, 2025, 8 pp.

\* cited by examiner

METHOD FOR DETECTING ANOMALIES IN IMAGES USING A PLURALITY OF MACHINE LEARNING PROGRAMS

CROSS-REFERENCE TO RELATED APPLICATIONS

This application claims priority from a European Patent Application having serial number 21195025.8, filed Sep. 6, 2021, titled "METHOD FOR DETECTING ANOMALIES IN IMAGES USING A PLURALITY OF MACHINE LEARNING PROGRAMS," which is incorporated herein by reference in its entirety.

FIELD OF THE INVENTION

This invention relates generally to machine vision systems, and more particularly, to the detection of anomalies in scenes observed by imaging sensors.

BACKGROUND OF THE INVENTION

The detection and localization of anomalies in image data is an important task in many machine vision applications. A common approach is to create a predictive program, called model, using machine learning by training it on images with human supervision, which is provided in the form of labels or annotations of anomalies in the images. However, anomalous images are often unavailable during model creation and it is difficult to determine all possible types of anomalies that may occur in practice. Therefore, anomaly detection methods that do not require anomalies to be annotated or present in the training images are desirable. In the manufacturing industry, for example, optical inspection tasks often lack an exhaustive set of defective samples that could be used for training an anomaly detection model. This is due to the low error rate of modern manufacturing machines and the high diversity of defects that may occur during production. This document describes a method for the detection of anomalies in images. Said method does not require anomalies to be annotated or present in the training images for model creation.

The landscape of methods for detecting anomalies in images is diverse and numerous approaches have been introduced to tackle the problem. Ehret et al. (EHRET, T., et al. Image Anomalies: A Review and Synthesis of Detection Methods. Journal of Mathematical Imaging and Vision, Volume 61, Issue 5, 2019. pp 710-743) give a comprehensive review of existing work. Many methods use neural networks due to their ability to learn discriminative representations, called features, that describe complex patterns in images. The following paragraphs describe the categories into which many methods based on neural networks fall.

Autoencoder-based methods attempt to reconstruct input images through a low-dimensional bottleneck. Examples of this are the methods proposed by Venkataramanan et al. (VENKATARAMANAN, S., et al. Attention Guided Anomaly Localization in Images. In: Computer Vision—ECCV 2020, Springer International Publishing, Cham, 2020. pp 485-503) and Liu et al. (LIU, W., et al. Towards Visually Explaining Variational Autoencoders. In: Proceedings of the IEEE/CVF Conference on Computer Vision and Pattern Recognition (CVPR), 2020. pp 8642-8651). Autoencoder-based approaches often rely on the assumption that the reconstruction of an anomalous image is less accurate than that of an anomaly-free image. For a new image that is to be searched for anomalies, an anomaly map can thus be derived by comparing said input image to its reconstruction. Unfortunately, autoencoders tend to produce blurry and inaccurate reconstructions. Bergmann et al. (BERGMANN, P., et al. Improving Unsupervised Defect Segmentation by Applying Structural Similarity to Autoencoders. In: 14th International Joint Conference on Computer Vision, Imaging and Computer Graphics Theory and Applications, Volume 5: VISAPP, Scitepress, Setúbal, 2019. pp 372-380) observe that this leads to an increase in false positives, i.e., anomaly-free pixels obtaining high anomaly scores due to reconstruction errors. Autoencoders might also learn to simply copy parts of the input data, which would allow them to reconstruct anomalous regions as well as anomaly-free regions. This results in an increase of false negatives if anomalous pixels obtain low anomaly scores due to accurate reconstructions. To discourage this behavior, Park et al. (PARK, H., et al. Learning Memory-Guided Normality for Anomaly Detection. In: Proceedings of the IEEE/CVF Conference on Computer Vision and Pattern Recognition (CVPR), 2020. pp 14372-14381) introduce the MNAD method, which uses an autoencoder with an integrated memory module. It selects numerous latent features during training that need to be reused for reconstruction during inference. While this helps, their method still suffers from blurry reconstructions.

Similar to autoencoders, methods based on generative adversarial networks (GANs) attempt to reconstruct images by finding suitable latent representations as input for the generator network. Schlegl et al. (SCHLEGL, T., et al. F-AnoGAN: Fast Unsupervised Anomaly Detection with Generative Adversarial Networks. In: Medical Image Analysis, Volume 54, 2019. pp 30-44) propose f-AnoGAN, for which an encoder network is trained to output the latent vectors that best reconstruct the training data. A per-pixel-position comparison of the input image and the reconstruction yields an anomaly map. Gulrajani et al. (GULRAJANI, I., et al. Improved Training of Wasserstein GANs. In: Advances in Neural Information Processing Systems, Volume 30, Curran Associates, Inc., 2017.) observe that GAN-based methods are difficult to train on high-resolution images. Hence, f-AnoGAN processes images at a resolution of 64×64 pixels, which results in very coarse anomaly maps.

Several existing state-of-the-art anomaly detection methods model the distribution of patch features extracted from pretrained networks. Examples of this are the methods proposed by Bergmann et al. (BERGMANN, P., et al. Uninformed Students: Student-Teacher Anomaly Detection With Discriminative Latent Embeddings. In: Proceedings of the IEEE/CVF Conference on Computer Vision and Pattern Recognition (CVPR), 2020. pp 4183-4192), Burlina et al. (BURLINA, P., et al. Where's Wally Now? Deep Generative and Discriminative Embeddings for Novelty Detection. In: Proceedings of the IEEE/CVF Conference on Computer Vision and Pattern Recognition (CVPR), 2019. pp 11507-11516) and Cohen and Hoshen (COHEN, N. and HOSHEN, Y. Sub-Image Anomaly Detection with Deep Pyramid Correspondences. arXiv preprint arXiv:2005.02357v1, 2020.).

Burlina et al. (BURLINA, P., et al. Where's Wally Now? Deep Generative and Discriminative Embeddings for Novelty Detection. In: Proceedings of the IEEE/CVF Conference on Computer Vision and Pattern Recognition (CVPR), 2019. pp 11507-11516) observe that methods that leverage features of pretrained networks tend to outperform autoencoder- or GAN-based methods that are trained from scratch. They achieve this by modeling the distribution of patch features obtained from spatially resolved activation layers of a pretrained network.

Cohen and Hoshen (COHEN, N. and HOSHEN, Y. Sub-Image Anomaly Detection with Deep Pyramid Correspondences. arXiv preprint arXiv:2005.02357v1, 2020.) fit a separate k-NN classifier for each row-column coordinate in the feature maps extracted from the anomaly-free training data. This makes the algorithm computationally expensive, which prohibits it from being employed in many practical applications.

Bergmann et al. (BERGMANN, P., et al. Uninformed Students: Student-Teacher Anomaly Detection With Discriminative Latent Embeddings. In: Proceedings of the IEEE/CVF Conference on Computer Vision and Pattern Recognition (CVPR), 2020. pp 4183-4192) propose the Student-Teacher method in which an ensemble of student networks matches patch descriptors of pretrained teacher networks on anomaly-free data. Anomalies are detected by increased regression errors and increased predictive variance in the students' predictions. The networks employed exhibit a limited receptive field, which prevents this method from detecting inconsistencies that fall outside the range of the largest receptive field. However, many types of anomalies can only be detected by analyzing the whole image instead of small patches of it.

For the foregoing reasons, there is a need for a method that can efficiently detect anomalies in images without being restricted by limited receptive fields or blurry reconstructions.

SUMMARY OF THE INVENTION

The invention is specified in the claims.

The presented invention provides a method for detecting anomalies in image data. In a typical application, images are acquired using, for example, a color or grayscale camera, and the images show, for example, objects or textures on which anomalies should be detected. The presence of anomalies in said images is then determined using the presented method. The resulting detection and optional localization of anomalies by the presented method is used, for example, to detect errors on an object's surface or to decide on the quality of a manufactured product.

The presented method has several advantages over previous methods: Because it learns a representation that possibly describes the whole input image, the detection of anomalies is not limited by receptive fields. Additionally, anomalies are, in a preferred embodiment, detected in a learnable feature space by comparing reconstructed features of regions in the input image, instead of reconstructed pixels in said input image. This avoids false positives, i.e., identifying anomaly-free pixels as being anomalous due to inaccurate reconstructions.

The method comprises two phases. In the training phase, the user needs to provide at least one training image. For each training image, a target representation is obtained. Said target representation may originate from various sources. For example, it can comprise feature maps extracted from a pretrained neural network applied to the respective training image. If no target representation is available for a training image, the training image itself is used as the target representation. Using the training images and their target representations, three machine learning programs are trained in the training phase. An encoder program and a decoder program are trained to predict the target representation of each training image. Said encoder program learns to output an intermediate training representation of lower dimensionality than the respective training image. Said decoder program, using said intermediate training representation as its input, is then trained to predict said respective target representation. The third machine learning program being trained is a regression program. Said regression program also receives the respective training image as its input and is trained to predict the output of said decoder program.

In the search phase, the user provides at least one search image. In each search image, the method searches for anomalies. For this, the method only requires said search image itself. In the search phase, no target representations are required. Said search image is given as an input to said encoder program, which computes an intermediate search representation. To said intermediate search representation, said decoder program is applied to compute a search decoding output for the respective search image. Using said respective search image as input, said regression program outputs a search regression output. Finally, anomaly scores are computed by comparing said search decoding output with said search regression output. Depending on the number and arrangement of said anomaly scores, the method may enable the localization of anomalies in said search image. For example, an element-wise comparison of said search decoding output with said search regression output may yield a spatially resolved anomaly map. A detection without localization could, for example, be performed by computing the difference between the average value of said search decoding output and the average value of said search regression output, followed by a subsequent thresholding of the difference to determine the binary result of the anomaly detection.

In the search phase, the use of a regression program has two advantages: Firstly, it obviates the need for target representations, as anomalies are detected by comparing the output of said decoder program with the output of said regression program, instead of with a target representation. In the search phase, said encoder program, said decoder program, and said regression program only operate on search images. Secondly, using said regression program avoids false positives caused by inaccurate predictions of said decoder program. For instance, when said target representation consists of said training image itself or of features from a pretrained neural network, it can be difficult for said decoder program to reconstruct said target representation accurately through the bottleneck given by said lower-dimensional intermediate representation. Said regression program can compensate this by learning to output similarly inaccurate feature maps, for example by also generating blurry reconstructions if said decoder program computes blurry reconstructions. This remedies a key disadvantage of autoencoders, which suffer from false positives caused by comparing inaccurate reconstructions with the input image.

The present disclosure relates to a computer implemented method for detecting anomalies in digital images using at least one machine learning programs, comprising the steps of: (a) acquiring one or more training images; (b) training said method on said training images by performing at least one training iteration, each training iteration comprising the steps of: (b1) selecting one or more images from said training images; (b2) computing a plurality of performance scores for each selected training image, comprising the steps of: (b21) obtaining a target representation for said selected training image; (b22) instructing an encoder program to compute an intermediate training representation of lower dimensionality than said selected training image by applying said encoder program to said selected training image; (b23) instructing a decoder program to compute a training decoding output of higher dimensionality than said intermediate training representation by applying said decoder program to said intermediate training representation; (b24) computing one or more decoding performance scores based on said training decoding output and said target representation of said selected training image; (b25) instructing a regression program to compute a training regression output by applying said regression program to said selected training image; (b26) computing one or more regression performance scores based on said training regression output and said training decoding output for said selected training image; (b3) adjusting the parameters of said machine learning programs to improve said performance scores for said selected training images; (c) acquiring one or more search images; (d) detecting anomalies in said search images, for each search image comprising the steps of: (d1) instructing said encoder program to compute an intermediate search representation of lower dimensionality than said search image by applying said encoder program to said search image; (d2) instructing said decoder program to compute a search decoding output of higher dimensionality than said intermediate search representation by applying said decoder program to said intermediate search representation; (d3) instructing said regression program to compute a search regression output by applying said regression program to said search image; (d4) applying a search similarity measure to said search regression output and said search decoding output for said search image to compute one or more search similarity values; (d5) computing one or more anomaly scores for said search image based on said search similarity values.

Various embodiments may preferably implement the following features:

According to a preferred embodiment, said anomaly scores computed in step (d5) are combined with one or more second anomaly scores computed by at least one second anomaly detection program and the presence of anomalies is determined based on some or all of the values of said anomaly scores computed in step (d5) and some or all of the values of said second anomaly scores.

According to a preferred embodiment, some or all of said computed anomaly scores, either computed by a first anomaly detection program alone or combined with one or more second anomaly scores computed by at least one second anomaly detection program, are spatially arranged, forming one or more anomaly maps for some or all of said search images.

According to a preferred embodiment, some or all of said anomaly maps are combined with one or more anomaly maps computed by at least one second anomaly detection program, comprising the steps of: (e1) obtaining one or more anomaly maps in step (d5) as first anomaly maps; (e2) computing one or more second anomaly maps by applying at least one second anomaly detection program to said search image; (e3) applying one or more transformations to said first and second anomaly maps; (e4) summing some or all of said first and second transformed anomaly maps to form at least one summed anomaly map, wherein at least one anomaly score in said summed anomaly map is the sum of anomaly scores from said first and second transformed anomaly maps.

According to a preferred embodiment, for at least one training image, said target representation comprises some or all of the output values of a neural network when applying said neural network to said training image.

According to a preferred embodiment, for at least one training image, said target representation comprises some or all of the values of said training image.

According to a preferred embodiment, for at least one training image, said target representation comprises one or more annotation values.

According to a preferred embodiment, at least one of said encoder program, decoder program, and regression program is a convolutional neural network.

According to a preferred embodiment, for at least one training image, the computation of at least one of said decoding performance scores comprises an element-wise comparison of said target representation with some or all of the values of said training decoding output.

According to a preferred embodiment, for at least one training image, the computation of at least one of said regression performance scores comprises an element-wise comparison of said training regression output with some or all of the values of said training decoding output.

According to a preferred embodiment, for at least one training image, one of said decoding performance scores is the squared Euclidean distance between said obtained target representation and some or all of the values of said training decoding output.

According to a preferred embodiment, for at least one training image, one of said regression performance scores is the squared Euclidean distance between said training regression output and some or all of the values of said training decoding output.

According to a preferred embodiment, for at least one search image, said search similarity measure computes one or more squared per-pixel-position Euclidean distances between said search regression output and some or all of the values of said search decoding output.

According to a preferred embodiment, one of or both of said encoder program and said decoder program are trained on one or more training images before the first parameter adjustment of said regression program.

According to a preferred embodiment, at least one of said training images is augmented using at least one augmentation method and at least one of said encoder program and said decoder program is applied to at least one of said augmented training images.

The present disclosure also relates to a system comprising a processor, wherein the processor is configured to execute the computer implemented method for detecting anomalies in digital images according to any one of the above-mentioned embodiments.

Various exemplary embodiments of the present disclosure are directed to providing features that will become readily apparent by reference to the following description when taken in conjunction with the accompanying drawings. In accordance with various embodiments, exemplary systems, methods, and devices are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

In the following, exemplary embodiments of the present disclosure will be described. It is noted that some aspects of any one of the described embodiments may also be found in some other embodiments unless otherwise stated or obvious. However, for increased intelligibility, each aspect will only be described in detail when first mentioned and any repeated description of the same aspect will be omitted.

BRIEF DESCRIPTION OF THE DRAWINGS

The invention will be more fully understood from the following detailed description, in conjunction with the accompanying figures, wherein.

Figure 1:
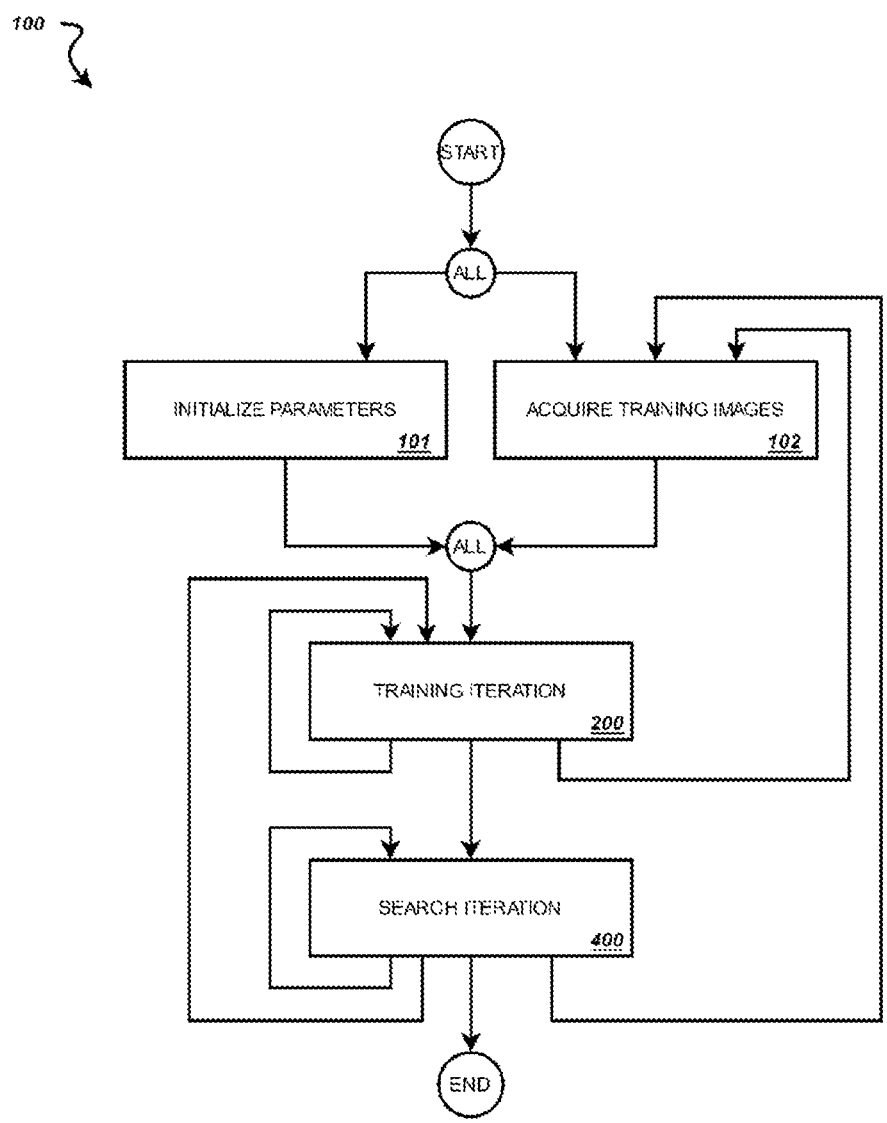
FIG. 1 is a flow diagram of an example anomaly detection process according to an embodiment of the present disclosure.

In each flow diagram, rectangles without rounded corners, for example 101 in FIG. 1, denote steps of a process. Rectangles without rounded corners and with a dashed border, for example 202 in FIG. 2, denote optional steps of a process. An optional step may be skipped. Rectangles with rounded corners, for example 301 in FIG. 3, denote inputs and outputs of said steps of a process.

Arrows denote the transition between steps. If multiple arrows begin at the bottom of a rectangle without rounded corners, for example at the bottom of 200 in FIG. 1, one of the respective transitions is performed.

A circle with the label "START" denotes the entry point of a process. A circle with the label "END" denotes the end point of a process. A circle with the label "ALL" denotes a state that is only reached after all incoming transitions, denoted by incoming arrows, have been performed at least once after the start of the respective process. Once said state is reached, all outgoing transitions, denoted by outgoing arrows, are performed. Said outgoing transitions, and the series of steps following each outgoing transition, may be performed sequentially, i.e., one path after another, or concurrently, on one or multiple computers.

A box with a label that begins with "START LOOP REPETITION" denotes the start of a program loop. Said loop ends at a box with a label that begins with "FINISH LOOP REPETITION". The sequence of steps in between said two boxes constitutes one repetition of said loop. The labels of said two boxes describe the number of repetitions.

Figure 2:
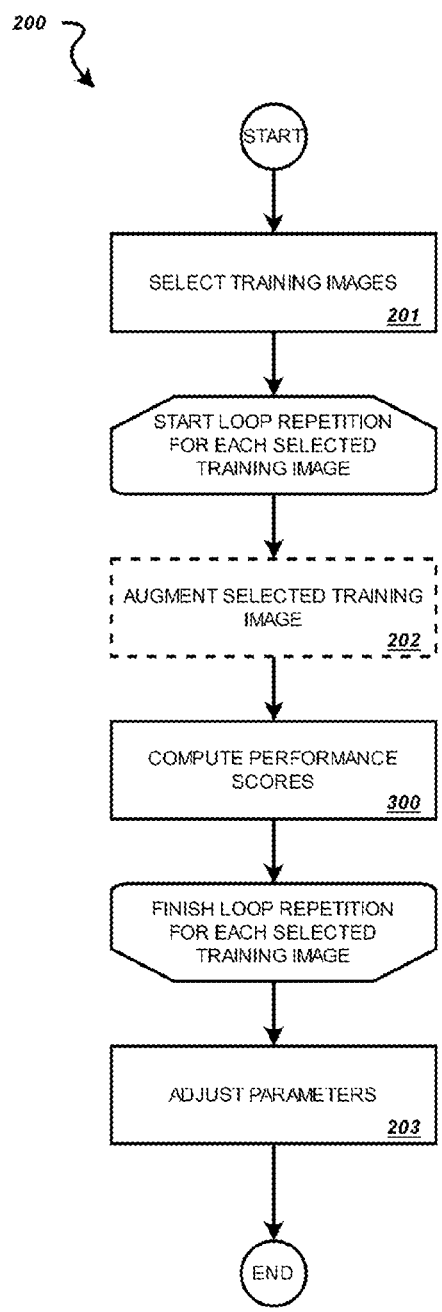
FIG. 2 is a flow diagram of an example process for performing one training iteration according to an embodiment of the present disclosure.

FIG. 2 contains a program loop, in which the steps 202 and 300 constitute a repetition that is performed for each selected training image. After a program loop's start box has been reached in the flow of transitions of a process, said repetitions may begin. A program loop's finish box is reached in the flow of transitions of a process after all of said repetitions have finished. Said repetitions may be performed sequentially, i.e., one path after another, or concurrently, on one or multiple computers.

DETAILED DESCRIPTION OF EMBODIMENTS

Denotations and Definitions

All of the following data is supposed to be available in electronic form, preferably digital. The methods and algorithms described are considered to be in electronic form and implemented as computer programs on one or more computers in one or more locations.

In this document, a value denotes a single scalar number.

In this document, an image channel is a two-dimensional grid containing one or more values. In said two-dimensional grid, said values are arranged in one or more rows and one or more columns. The first of said two dimensions is the height, i.e., the number of rows, of said grid. The second of said two dimensions is the width, i.e., the number of columns, of said grid. Each cell in said two-dimensional grid contains at most one value. A pixel position refers to a row-column coordinate in said two-dimensional grid. An image comprises one or more image channels. The values of said two-dimensional grids of the image channels of an image are called the values of said image. In a preferred embodiment, all image channels of an image have the same width and the same height. In an alternative embodiment, at least two image channels of an image differ with respect to their width or their height, or both. If all image channels of an image have the same width and the same height, said width and said height are called the width and the height of the image, respectively. If all image channels of an image have the same width and the same height, each image channel of said image has the same collection of pixel positions, called the pixel positions of said image. In a preferred embodiment, all images have the same height, the same width, and the same number of channels, for example three channels in the case of RGB images or one channel in the case of grayscale images. In an alternative embodiment, at least two images differ with respect to at least one of the following three attributes: their width, their height and their number of channels. In a preferred embodiment, each cell of said two-dimensional grid contains exactly one value. In an alternative embodiment, at least one image has at least one channel in which at least one cell does not contain a value. For the sake of brevity and comprehensibility, an image also refers to imaging data structures other than 2D pixel grids, for example 3D voxel grids or 3D point clouds.

In this document, an anomaly refers to the deviation of one or more values in an image from their expected range. Anomaly detection refers to the task of deciding whether an image contains an anomaly or not. An anomaly score is a value that denotes the presence of an anomaly in an image or in a subset of the values of an image. An image anomaly score is an anomaly score that denotes the presence of an anomaly in an image. A regional anomaly score is an anomaly score that denotes the presence of an anomaly in a region of an image. A search image is an image that is to be searched for anomalies. In a preferred embodiment, a computer program performing anomaly detection outputs one regional anomaly score for each pixel position for each given search image. In an alternative embodiment, said computer program outputs, for at least one pixel position and at least one search image, zero or multiple regional anomaly scores. In an alternative embodiment, said computer program outputs, for at least one search image, one or more regional anomaly scores, with each regional anomaly score corresponding to one or more locations in the given search image. In an alternative embodiment, said computer program outputs, for at least one search image, one or more image anomaly scores and zero or more regional anomaly scores. In an alternative embodiment, said computer program outputs at least one of the following three types of anomaly scores: an image anomaly score for the given search image, a regional anomaly score for each pixel position in the given search image, and a regional anomaly score that corresponds to one or more locations in the given search image. Additionally, more than one anomaly score of each of said three types of anomaly scores can be returned without departing from the spirit of the invention.

In this document, an anomaly map is a multi-dimensional grid that contains anomaly scores. In a preferred embodiment, said multi-dimensional grid is a two-dimensional grid in which anomaly scores are arranged in one or more rows and one or more columns. In an alternative embodiment, said multi-dimensional grid contains anomaly scores arranged in three or more dimensions. In a preferred embodiment, a computer program performing anomaly detection generates all regional anomaly scores in the form of one or more anomaly maps. In an alternative embodiment, said computer program generates some regional anomaly scores that denote the presence of an anomaly in a region of an image without being part of an anomaly map. In an alternative embodiment, said computer program generates no anomaly maps and only outputs one or more image anomaly scores. In a preferred embodiment, each grid position of an anomaly map contains an anomaly score. In an alternative embodiment, one or more grid positions of an anomaly map do not contain an anomaly score.

In this document, a machine learning program denotes a computer program that processes one or more input values to generate one or more output values in accordance with the values of a set of parameters. Said input values are called the input of said machine learning program. Said output values are called the output of said machine learning program. Said set of parameters comprises one or more values, which are called the parameters of said machine learning program. A machine learning program can be used to perform one or more tasks. Multiple machine learning programs can be used in combination to perform one or more tasks. The presented method combines multiple machine learning programs to perform anomaly detection. The performance of one or more machine learning programs on one or more tasks can be measured with one or more performance measures. A performance measure is a computer program that processes one or more values, called performance input values in this document, to compute one or more values, called performance scores in this document. Said performance input values comprise all of or a subset of the union of said input values, output values and parameters of the respective machine learning programs. For example, said performance input values may consist of all output values, some of the parameters and no input values of some or all of the respective machine learning programs. Said performance input values may also comprise additional values, for example desired output values for said input values. Mitchell (MITCHELL, T. M. Machine Learning. McGraw-Hill series in computer science, McGraw-Hill: New York, 1997. Chapter 1) and Goodfellow et al. (GOODFELLOW, I., et al. Deep Learning. MIT Press, 2016. Chapter 5) provide a comprehensive definition of machine learning accompanied by examples of tasks and performance measures.

Applying a machine learning program to one or more given values refers to the computation of said output values of said machine learning program while using some or all of said given values as said input values of said machine learning program. Thus, when a machine learning program is applied to an image, all or a subset of the values that said image contains are used as input values of said machine learning program. The dimensionality of said output of a machine learning program is the number of output values in said output. The dimensionality of said input of a machine learning program is the number of input values in said input. The dimensionality of an image is the number of values that said image consists of. The dimensionality of a collection of values is the number of values that said collection consists of.

In this document, an element-wise comparison denotes the comparison of two collections of values, wherein each of said collections contains the same number of values and each value of the first of said two collections is compared with one of the values of the second of said two collections.

In this document, an element-wise affine transformation of a first collection of values refers to a transformation of said values of said collection that is parameterized by a single scaling value and a single shifting value. The result of an element-wise affine transformation is a second collection of values with the same dimensionality, structure and order as said first collection. Each value of said first collection is transformed to exactly one value of said second collection. Said transformation of said value of said first collection consists of the multiplication of said value with said scaling value, followed by the addition of said shifting value to the result of said multiplication.

In this document, a neural network denotes a machine learning program that, given one or more input values, computes one or more output values through a conceptual directed graph of units, called neurons. Depending on the structure of said conceptual graph, a neural network may compute said output values without implementing each neuron as an individual node in a graph data structure. In the following, the conceptual definition of a neural network will be explained. Subsequently, examples of common implementation forms that do not require implementing each neuron as an individual node in a graph data structure will be given.

Conceptually, said neurons are connected to other neurons and to said input values through directed edges. Each neuron computes a single value, called the output of said neuron. A directed edge (hereinafter simply denoted as "edge") transmits a value from its source to its destination. Said source is either an input value or said output of a neuron. The destination is always a neuron. Each neuron has at least one incoming edge. Said sources of said incoming edges of a neuron consist of zero or more input values and zero or more other neurons. The values of said incoming edges of a neuron are called the incoming values of said neuron. Said output of a neuron is computed in accordance with the incoming values of said neuron and values of a set of parameters of said neuron. For example, if said output of a neuron is the sum of its incoming values, then said set of parameters of said neuron may be an empty set. As another example, if said output of a neuron is the sum of a first parameter value and the incoming values of said neuron, then said set of parameters of said neuron comprises said first parameter value. As another example, if said output of a neuron is the weighted sum of its incoming values, with each incoming value being multiplied by a weight value before said summation, then said set of parameters of said neuron comprises said weight values. As another example, if said output of a neuron with one incoming value is a non-linear function applied to said incoming value, then said set of parameters of said neuron comprises the parameters of said non-linear function. A neuron may have a bias value, which denotes a value that is added to the output of said neuron. In this case, said bias value is one of the parameters of said neuron. The parameters of all neurons of a neural network are called the parameters of said neural network. The output values of a neural network consist of the outputs of one or more neurons in said neural network. An output value of a neural network may be one of the incoming values of another neuron in the same neural network. The collection of output values of the neural network is called the output of the neural network. Applying a neural network to one or more given values refers to the computation of the output values of said neural network while using said given values as the input values of said neural network. Thus, when a neural network is applied to an image, all or a subset of the values that said image contains are used as input values of said neural network. Mitchell (MITCHELL, T. M. Machine Learning. McGraw-Hill series in computer science, McGraw-Hill: New York, 1997. Chapter 4) provides a detailed explanation of neural networks.

In some neural networks, said structure of said conceptual graph allows computing the output of some or all neurons without implementing each of said neurons as an individual node in a graph data structure. For example, if multiple neurons have the same incoming values and the output of each of said neurons is a weighted sum of the incoming values of the respective neuron, then the outputs of said neurons can be computed in a single matrix-vector multiplication. In said matrix-vector multiplication, the vector contains said incoming values and the matrix contains one weight value for each combination of neuron and incoming value. The result of said matrix-vector multiplication contains the output of each of said neurons. In another example, if multiple neurons have two incoming values and the output of each of said neurons is the sum of said two incoming values of the respective neuron, then the outputs of said neurons can be computed in a single vector-vector addition. In said vector-vector addition, the first vector contains the first of said two incoming values for each of said neurons and the second vector contains the second of said two incoming values for each of said neurons.

Different types of neural networks exist, for example convolutional neural networks, recurrent neural networks, and recursive neural networks. Said types of neural networks are often characterized based on operations performed by the respective neural network, such as a convolution in the case of convolutional neural networks. Said types of neural networks can often be combined in a neural network, for example in a convolutional recurrent neural network. Goodfellow et al. (GOODFELLOW, I., et al. Deep Learning. MIT Press, 2016. Chapters 9 and 10) provide a detailed explanation of popular types of neural networks, for example convolutional neural networks and recurrent neural networks.

In this document, a similarity measure is a computer program that computes a similarity or dissimilarity between a first collection of values and a second collection of values. The result computed by a similarity measure consists of one or more values, called similarity values. For some similarity measures, an increasing similarity value denotes an increasing similarity. For other similarity measures, an increasing similarity value denotes a decreasing similarity, as is the case with the absolute distance between two values, for example.

In this document, an encoder program is a machine learning program, whose output has a lower dimensionality than the input of said encoder program and whose output is part of the input to another machine learning program, which is called decoder program. The output of an encoder program is called intermediate representation. A decoder program is a machine learning program, whose input is the intermediate representation of an encoder program and whose output has a higher dimensionality than said intermediate representation.

In this document, training a machine learning program refers to the process of adjusting some or all of said parameters of said machine learning program to improve said performance scores computed by one or more performance measures. Said training comprises one or more training iterations 200. In this document, a training dataset denotes a set of one or more images that are used for said training, called training images. In each training iteration 200, one or more training images are selected. In each training iteration 200, said machine learning program being trained is applied to each of said selected training images or to said intermediate representations computed by an encoder program on said selected training images. For each selected training image, said performance scores are computed by said performance measures based on said input values, output values and parameters of said machine learning program being trained during said application to said selected training image. If said computation of said performance scores requires additional performance input values, these need to be specified for said selected training images. For example, if the task of a first machine learning program is to predict the output of a second machine learning program, said output of said second machine learning program may be included in said performance input values during the training of said first machine learning program. In each training iteration 200, said parameters of said machine learning program being trained are adjusted to improve said performance scores computed for said selected training images. Some of said parameters may be excluded from said adjustment. For example, the parameters of neurons that compute a non-linear function based on a single incoming value are often excluded from adjustment during the training of a neural network.

In this document, pretraining refers to the training of a machine learning program prior to a subsequent training in which said machine learning program is used. The training dataset and the used performance measures may be the same or differ between said pretraining and said subsequent training. Additionally, the pretrained machine learning program does not need be trained in said subsequent training. For example, in said subsequent training, a machine learning program may be trained to predict the output of a pretrained neural network without said pretrained neural network being adjusted in said subsequent training.

In this document, a target representation is the collection of desired output values of a decoder program for a selected training image during the training of said decoder program. The dimensionality of a target representation does not need be equal to the dimensionality of the output of said decoder program, for example if said desired output values only correspond to a subset of the output of said decoder program.

In this document, a regression program is a machine learning program whose desired output values during the training of said regression program are given by some or all of the output values of a decoder program. Thus, a regression program is trained to predict some or all of the output values of a decoder program. If a regression program and the respective decoder program are trained jointly, the parameters of said decoder program may be adjusted so as to facilitate the task of said regression program, i.e., improve the performance scores used for training said regression program.

In this document, augmentation refers to a transformation or a series of transformations applied to a training image or a search image. The augmentation of an image comprises the sequential application of one or more transformations, called augmentation methods. Some augmentation methods augment a plurality of images jointly, for example by computing the element-wise average of multiple training images.

In this document, a feature map is a two-dimensional grid that contains values describing features of an image. In said two-dimensional grid, said values are arranged in one or more rows and one or more columns. The first of said two dimensions is the height, i.e., the number of rows, of said grid. The second of said two dimensions is the width, i.e., the number of columns, of said grid. A collection of feature maps contains one or more feature maps.

Figure 5:
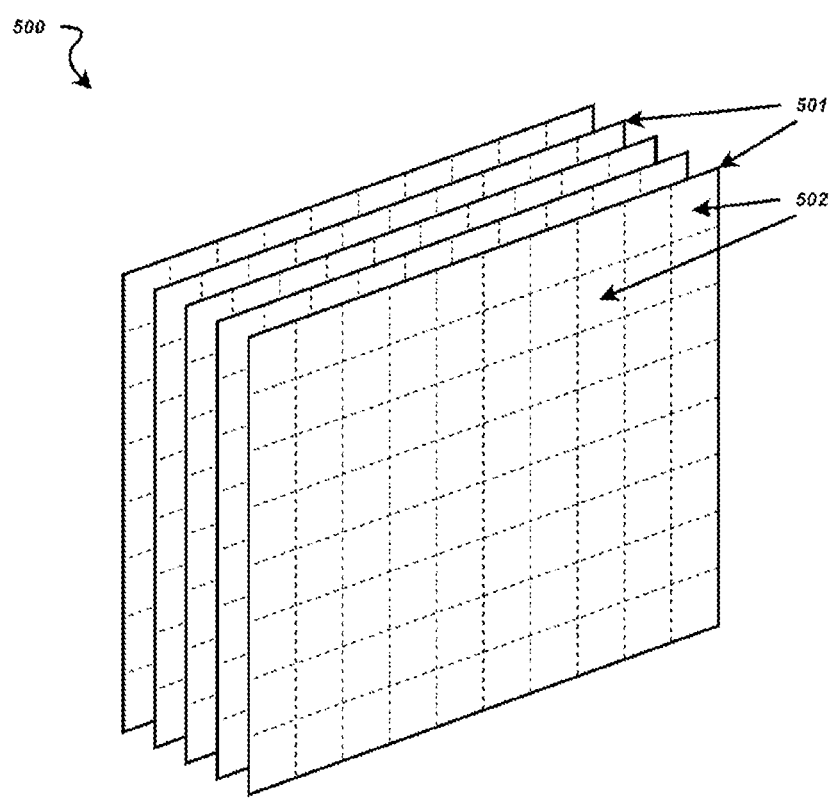
FIG. 5 shows an exemplary collection of feature maps according to an embodiment of the present disclosure.

FIG. 5 shows an exemplary collection of feature maps 500. Said exemplary collection contains five feature maps, with each feature map 501 containing eight rows and ten columns. The two-dimensional grid of the first feature map 501 is denoted by dashed lines. It consists of eighty cells 502, each of which contains one value. The collection of feature maps shown in FIG. 5 is exemplary. In other feature maps than those shown in FIG. 5, the number of rows, the number of columns and the number of values per cell may vary. For example, in a sparse feature map, one or more cells do not contain a value. In the exemplary collection of feature maps shown in FIG. 5, each feature map has the same size, i.e., the same number of rows and columns. In another collection of feature maps, one or more feature maps may have a different size than another feature map in the same collection of feature maps. Additionally, the number of feature maps may vary.

Training Phase

The method comprises two phases: a training phase and a search phase. In the training phase of the method, an encoder program, a decoder program, and a regression program are trained. In the search phase, said programs are used to detect anomalies in one or more search images by performing one or more search iterations.

FIG. 1 is a flow diagram of an example anomaly detection process 100. The steps of an anomaly detection process 100 are explained in the following sections.

In this document, the method's programs refer to said three programs, being said encoder program, said decoder program and said regression program. In a preferred embodiment, the method's programs are convolutional neural networks. In an alternative embodiment, at least one of the method's programs is a neural network that does not comprise a convolution operation. In an alternative embodiment, at least one of the method's programs is a machine learning program other than a neural network, for example a k-Nearest Neighbors program, a Support Vector Machine, or a Decision Tree. Additionally, some or all of the method's programs may be an ensemble of machine learning programs without departing from the spirit of the invention.

Parameter Initialization 101

This section describes the parameter initialization step 101. In the anomaly detection process 100 depicted in FIG. 1, said parameter initialization step 101 is referred to as step 101. Prior to the first training iteration 200, the parameters of said encoder program, decoder program and regression program are set to initial values.

In a preferred embodiment, said initial values are set in accordance with the specification of the machine learning method used by the respective machine learning program. For example, in a neural network, the bias values of neurons are commonly set to zero initially. As another example, in a neural network, the weight values used by neurons whose output computation comprises weighted sums are commonly initialized by a pseudo-random number generator program in accordance with the specification of a certain probability distribution, for example a normal distribution. In an alternative embodiment, some or all of said initial values are obtained by pretraining one or more machine learning programs. For example, the parameters of said encoder program may be initialized with some or all of the parameters of a machine learning program trained to classify images from a separate training dataset.

Training Image Acquisition 102

This section describes the training image acquisition step 102. In the anomaly detection process 100 depicted in FIG. 1, said training image acquisition step is referred to as step 102. Prior to the first training iteration 200, one or more training images are acquired.

In aa preferred embodiment, all training images are acquired before the first training iteration. In an alternative embodiment, new training images are acquired and added to the collection of all training images during or after a training iteration.

In aa preferred embodiment, all training images are 2D grayscale or 2D color images. In an alternative embodiment, some or all of said training images comprise other sensor data obtained, for example, from hyperspectral imaging sensors or depth cameras. In an alternative embodiment, some or all of said training images are 3D images, for example 3D point clouds or 3D voxel grids.

In a preferred embodiment, all training images have the same width, height and number of image channels. In an alternative embodiment, some or all of said training images differ in width, height or the number of image channels.

Training Iteration 200

The following sections describe the process for performing a training iteration 200. In the anomaly detection process 100 depicted in FIG. 1, a training iteration is referred to as step 200. After said parameters have been initialized (step 101) and one or more training images have been acquired (step 102), the first training iteration 200 begins. Each training iteration 200 is followed either by another training iteration 200, a search iteration 400 or the acquisition of one or more additional training images 102.

FIG. 2 is a flow diagram of an example process for performing one training iteration 200. In the first step of each training iteration 200, one or more images are selected from said training images. In the training iteration process 200 depicted in FIG. 2, said selection of training images is referred to as step 201. The subsequent steps 202, 300, and 203 of said training iteration process 200 are explained in the following sections.

Training Image Augmentation 202

This section describes the training image augmentation step 202. In the training iteration process 200 depicted in FIG. 2, said training image augmentation step is referred to as step 202. Each of said training images selected in step 201 may optionally be augmented before being used in the subsequent steps of the training iteration process 200.

In a preferred embodiment, each selected training image is augmented using one or more augmentation methods specified by the user. In a preferred embodiment, the choices for said augmentation methods are a randomized rotation, randomized horizontal and vertical flipping, and a randomized color variation of the respective training image. In a preferred embodiment, the parameters of said augmentation methods are specified by the user, for example the probability and degree of said randomized rotation. In an alternative embodiment, said augmentation methods comprise other or additional transformations, for example a randomized resizing or cropping of the respective training image. In an alternative embodiment, the usage, the parameters, or both, of at least one of said augmentation methods is not specified by the user, but determined automatically, for example based on properties of the respective training image. Said automatic determination of an augmentation method may, for example, comprise testing said training images for horizontal symmetries and accordingly applying random horizontal flips to each training image. In an alternative embodiment, at least one of said augmentation methods augments a plurality of training images jointly, for example by computing the element-wise average of multiple training images. In an alternative embodiment, at least one of said augmentation methods is not a randomized but a fixed transformation of one or more training images.

In a preferred embodiment, if multiple augmentation methods are specified, multiple augmentation methods are applied to a training image. In an alternative embodiment, if multiple augmentation methods are specified, only one or no augmentation method is applied per training image.

In a preferred embodiment, each of said selected training images is augmented once, using multiple augmentation methods, in one training iteration. Thus, a training image may be augmented multiple times over the course of multiple training iterations, if said training image is selected multiple times. In an alternative embodiment, for at least one selected training image that has been selected in a previous training iteration, the augmented image from said previous training iteration is reused. In an alternative embodiment, at least one of said selected training images is not augmented or augmented multiple times in one training iteration.

In a preferred embodiment, each selected training image is replaced by its respective augmented image before being used in the subsequent steps of the training iteration process 200. In an alternative embodiment, at least one selected training image is kept in the collection of selected training images and said collection is extended with the augmentations of said training images.

In a preferred embodiment, a training image augmentation step 202 is only performed on selected training images during a training iteration 200. In an alternative embodiment, a training image augmentation step 202 is only or additionally performed prior to a training iteration 200 on some or all training images acquired in step 102. In an alternative embodiment, no training image augmentation step 202 is performed over the course of the anomaly detection process 100.

Performance Scores Computation 300

The following sections describe the process for computing performance scores 300 in a training iteration 200. In the training iteration process 200 depicted in FIG. 2, the computation of performance scores is referred to as step 300. After one or more training images have been selected (step 201) and optionally augmented (step 202), one or more performance scores are computed for each selected training image. Said computation of performance scores 300 for a possibly augmented selected training image only requires said selected training image itself and does not depend on other selected training images. Thus, said computation of performance scores 300 may be performed concurrently to the augmentation 202 or performance scores computation 300 of another selected training image.

Figure 3:
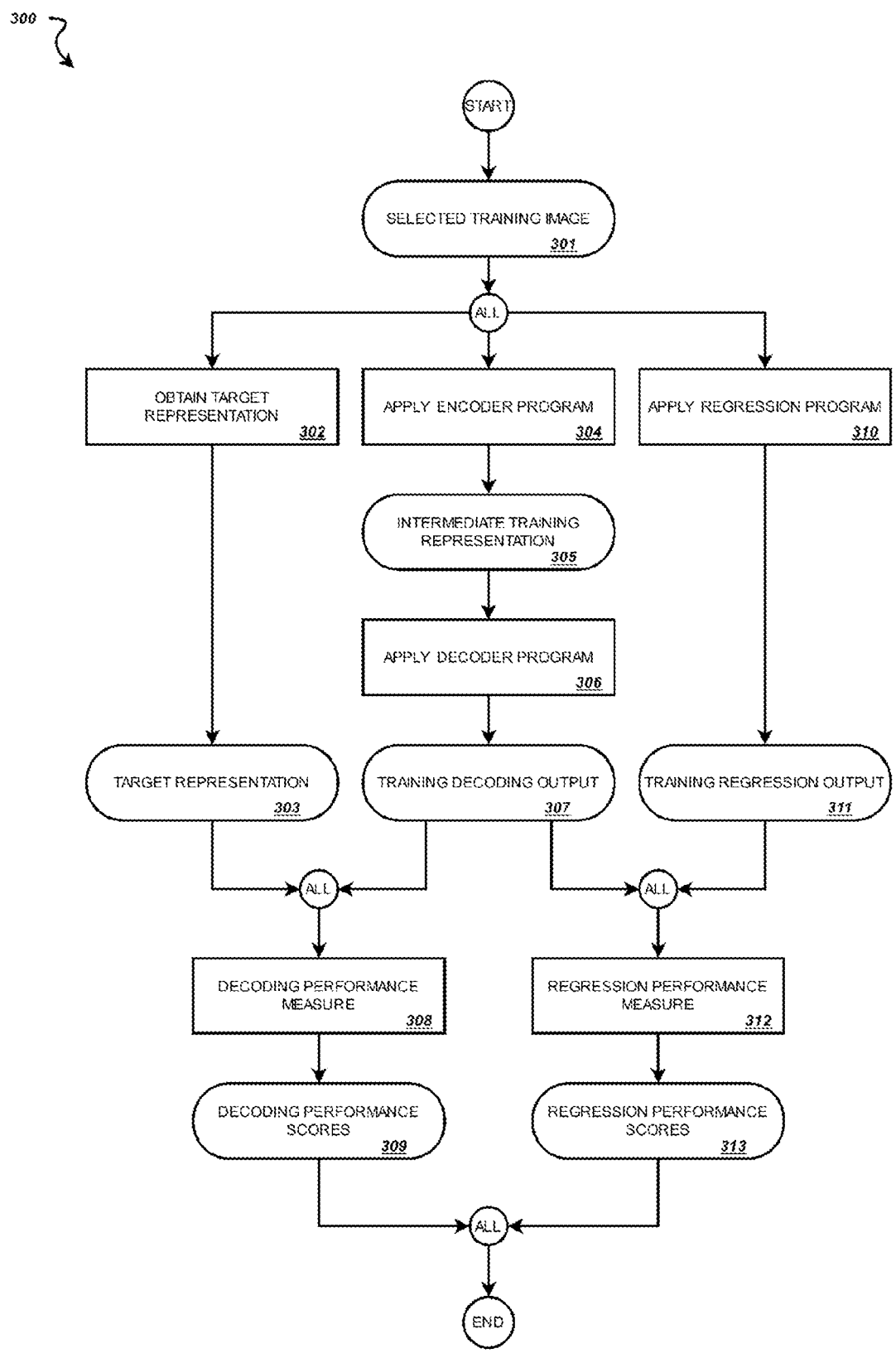
FIG. 3 is a flow diagram of an example process for computing performance scores for a given selected training image according to an embodiment of the present disclosure.

FIG. 3 is a flow diagram of an example process for computing performance scores for a given selected training image. In the performance scores computation process 300 depicted in FIG. 3, said selected training image is denoted by 301. The steps 302, 304, 306, 308, 310, and 312 of said performance scores computation process 300 are explained in the following sections.

Obtaining a Target Representation 302

This section describes the step of obtaining a target representation, formally denoted by $Y^{target}$, for a given selected training image 301. In the performance scores computation process 300 depicted in FIG. 3, obtaining a target representation is referred to as step 302 and the obtained target representation is denoted by 303.

In a preferred embodiment, said target representation comprises some or all of the output values of a pretrained convolutional neural network, pretrained on an image classification dataset, when applying said pretrained neural network to said selected training image. In an alternative embodiment, said pretrained neural network is pretrained on an image dataset for a task other than classification, for example semantic segmentation or object detection. In an alternative embodiment, said pretrained neural network is pretrained on a dataset that comprises data other than images. In an alternative embodiment, said pretrained neural network is not a convolutional neural network. In an alternative embodiment, said target representation comprises some or all of the output values of a neural network that has not been trained. In an alternative embodiment, said target representation comprises some or all of the output values of a machine learning program that is not a neural network, for example a Support Vector Machine or a Decision Tree. In an alternative embodiment, said target representation comprises some or all of the values of said training image. In an alternative embodiment, said target representation comprises annotation values obtained, for example, from a human annotation of said training image.

In a preferred embodiment, said target representation is spatially arranged in a collection of feature maps and each of said feature maps has the same width and height as said training image. In an alternative embodiment, at least one of the width and the height of at least one of said feature maps differs from the respective width and height of said training image. In an alternative embodiment, some or all of the values of said target representation are spatially arranged in one or more multi-dimensional grids with more than two dimensions, for example a three-dimensional voxel grid instead of a feature map. In an alternative embodiment, some or all of the values of said target representation are spatially arranged in a data structure that is not a grid, for example a 3D point cloud. In an alternative embodiment, said target representation comprises one or more values without a spatial correspondence to locations in said training image.

In a preferred embodiment, each target representation obtained over the course of the anomaly detection process has the same number of feature maps. Said number of feature maps in said target representation is formally denoted by $C^{target}$. In an alternative embodiment, at least one target representation has a different number of feature maps than another target representation.

Applying the Encoder Program 304

This section describes the step of applying said encoder program 304 to said selected training image 301 to compute an intermediate representation, called intermediate training representation 305. In the performance scores computation process 300 depicted in FIG. 3, applying said encoder program is referred to as step 304 and said intermediate training representation is denoted by 305. Formally, the application of said encoder program, denoted by E, to a training image $X^{train}$ can be written as $M^{train}=E(X^{train})$, where $M^{train}$ is said intermediate training representation.

In a preferred embodiment, all intermediate training representations computed over the course of an anomaly detection process have the same dimensionality. In an alternative embodiment, some or all of the dimensionalities of said intermediate training representations differ.

Applying the Decoder Program 306

This section describes the step of applying said decoder program 306 to said intermediate training representation 305 to compute a training decoding output 307. In the performance scores computation process 300 depicted in FIG. 3, applying said decoder program is referred to as step 306 and said training decoding output is denoted by 307. Formally, the application of said decoder program 306, denoted by D, to said intermediate training representation $M^{train}$ can be written as $Y^{dec}=D(M^{train})$, where $Y^{dec}$ is said training decoding output 307.

In a preferred embodiment, said training decoding output is spatially arranged in a collection of feature maps and each of said feature maps has the same width and height as said training image. In an alternative embodiment, at least one of the width and the height of at least one of said feature maps differs from the respective width and height of said training image. In an alternative embodiment, some or all of the values of said training decoding output are spatially arranged in one or more multi-dimensional grids with more than two dimensions, for example a three-dimensional voxel grid instead of a feature map. In an alternative embodiment, some or all of the values of said training decoding output are spatially arranged in a data structure that is not a grid, for example a 3D point cloud. In an alternative embodiment, said training decoding output comprises one or more values without a spatial correspondence to locations in said training image.

In a preferred embodiment, each training decoding output computed over the course of the anomaly detection process has the same number of feature maps. Said number of feature maps in said training decoding output is formally denoted by $C^{dec}$. In an alternative embodiment, at least one training decoding output has a different number of feature maps than another training decoding output.

Decoding Performance Measure 308

This section describes the step of comparing said obtained target representation 303 with said training decoding output 307 using a performance measure called decoding performance measure 308. The performance scores computed by said decoding performance measure are called decoding performance scores 309. In the performance scores computation process 300 depicted in FIG. 3, said decoding performance measure computation is referred to as step 308 and said decoding performance scores are denoted by 309. The performance input values of said decoding performance measure 308 comprise some or all of said training decoding output values 307 and some or all of said obtained target representation values 303.

In a preferred embodiment, said decoding performance measure computes a single decoding performance score. In an alternative embodiment, said decoding performance measure computes a plurality of decoding performance scores.

In a preferred embodiment, $C^{dec}$ is greater than $C^{target}$ and only the first $C^{target}$ feature maps of said training decoding output, together with all $C^{target}$ feature maps of said obtained target representation, are used as performance input values for computing said decoding performance scores. In an alternative embodiment, $C^{dec}$ is smaller than, equal to or greater than $C^{target}$ and, for computing said decoding performance scores, some or all of said $C^{dec}$ feature maps of said training decoding output and some or all of said $C^{target}$ feature maps of said obtained target representation are used. In an alternative embodiment, said performance input values of said decoding performance measure comprise values in at least one of $Y^{target}$ and $Y^{dec}$ that are not spatially arranged in a feature map.

In a preferred embodiment, said decoding performance score is the squared Euclidean distance between said respective feature maps of said training decoding output and said obtained target representation. In a preferred embodiment, said squared Euclidean distance is computed by computing, for each pixel position in said training image and each feature map in said obtained target representation, the difference between the value of said training decoding output at said pixel position in said feature map and the value of said obtained target representation at said pixel position in said feature map, squaring all said computed differences and summing all said computed squares. Said computation of said decoding performance score, formally denoted by $P^{dec}$, as said squared Euclidean distance between said respective feature maps of said training decoding output $Y^{dec}$ and said obtained target representation $Y^{target}$ can formally be written as $$P^{dec} = \sum_{c=1}^{C^{target}} \sum_{p \in Pos} \left(Y_{c,p}^{dec} - Y_{c,p}^{target}\right)^2,$$

where c denotes the index of a feature map, Pos denotes the collection of pixel positions in said respective training image $X^{train}$ and $Y_{c,p}^{dec}$ and $Y_{c,p}^{target}$ denote the value of $Y^{dec}$ and $Y^{target}$, respectively, in the feature map with index c at a pixel position p. In an alternative embodiment, the computation of said decoding performance scores comprises an element-wise comparison of said obtained target representation and some or all of the values of said training decoding output, in particular said element-wise comparison comprises computing said squared Euclidean distance according to said computational method. Consequently, when said decoding performance score is said squared Euclidean distance between said respective feature maps of said training decoding output and said obtained target representation, the computation of said decoding performance scores comprises said element-wise comparison of said obtained target representation and some or all of the values of said training decoding output. In a yet alternative embodiment, the computation of said decoding performance scores comprises an element-wise comparison of said training decoding output and said obtained target representation other than said squared Euclidean distance. In an alternative embodiment, the computation of said decoding performance scores comprises the application of one or more similarity measures to some or all values of said training decoding output and some or all values of said obtained target representation. In an alternative embodiment, the computation of said decoding performance scores comprises a post-processing of at least one of said training decoding output and said obtained target representation, for example zooming both to the same height and width for an element-wise comparison. Additionally, said performance input values of said decoding performance measure may comprise values other than said training decoding output and said obtained target representation without departing from the spirit of the invention.

Applying the Regression Program 310

This section describes the step of applying said regression program 310 to said selected training image 301 to compute a training regression output 311. In the performance scores computation process 300 depicted in FIG. 3, applying said regression program is referred to as step 310 and said training regression output is denoted by 311. Formally, the application of said regression program 310, denoted by R, to said training image $X^{train}$ can be written as $Y^{reg}=R(X^{train})$, where $Y^{reg}$ is said training regression output 311.

In a preferred embodiment, said training regression output is spatially arranged in a collection of feature maps and each of said feature maps has the same width and height as said training image. In an alternative embodiment, some or all of the values of said training regression output are spatially arranged in one or more multi-dimensional grids with more than two dimensions, for example a three-dimensional voxel grid instead of a feature map. In an alternative embodiment, some or all of the values of said training regression output are spatially arranged in a data structure that is not a grid, for example a 3D point cloud. In an alternative embodiment, said training regression output comprises one or more values without a spatial correspondence to locations in said training image.

In a preferred embodiment, each training regression output computed over the course of the anomaly detection process has the same number of feature maps. Said number of feature maps in said training regression output is formally denoted by Creg. In an alternative embodiment, at least one training regression output has a different number of feature maps than another training regression output.

Regression Performance Measure 312

This section describes the step of comparing said training regression output 311 with said training decoding output 307 using a performance measure called regression performance measure 312. The performance scores computed by said regression performance measure are called regression performance scores 313. In the performance scores computation process 300 depicted in FIG. 3, said regression performance measure computation is referred to as step 312 and said regression performance scores are denoted by 313. The performance input values of said regression performance measure 312 comprise some or all of said training decoding output values 307 and some or all of said training regression output values 311.

In a preferred embodiment, said regression performance measure computes a single regression performance score. In an alternative embodiment, said regression performance measure computes a plurality of regression performance scores.

In a preferred embodiment, $C^{dec}$ is the sum of $C^{target}$ and Creg and only the last Creg feature maps of said training decoding output, together with all Creg feature maps of said training regression output, are used as performance input values for computing said regression performance scores. In an alternative embodiment, $C^{dec}$ is smaller than, equal to or greater than the sum of $C^{target}$ and Creg and, for computing said regression performance scores, some or all of said $C^{dec}$ feature maps of said training decoding output and some or all of said Creg feature maps of said training regression output are used. In an alternative embodiment, said performance input values of said regression performance measure comprise values in at least one of $Y^{reg}$ and $Y^{dec}$ that are not spatially arranged in a feature map.

In a preferred embodiment, said regression performance score is the squared Euclidean distance between said training regression output and said respective feature maps of said training decoding output. In a preferred embodiment, said squared Euclidean distance is computed by computing, for each pixel position in said training image and each feature map in said training regression output, the difference between the value of said training regression output at said pixel position in said feature map and the value of said training decoding output at said pixel position in said feature map, squaring all said computed differences and summing all said computed squares. Said computation of said regression performance score, formally denoted by $P^{reg}$, as said squared Euclidean distance between said training regression output $Y^{reg}$ and said respective feature maps of said training decoding output $Y^{dec}$ can formally be written as $$P^{reg} = \sum_{c=1}^{C^{reg}} \sum_{p \in Pos} \left(Y^{reg}_{c,p} - Y^{dec}_{C^{target}+c,p}\right)^2,$$

where c denotes the index of a feature map, Pos denotes the collection of pixel positions in said respective training image $X^{train}$, $Y_{c,p}^{reg}$ denotes the value of $Y^{reg}$ in the feature map with index c at a pixel position p, and $Y_{C^{target}+c,p}^{dec}$ denotes the value of $Y^{dec}$ in the feature map whose index is the sum of $C^{target}$ and c, at a pixel position p. In an alternative embodiment, the computation of said regression performance scores comprises an element-wise comparison of said training regression output and some or all of the values of said training decoding output, in particular said element-wise comparison comprises computing said squared Euclidean distance according to said computational method. Consequently, when said regression performance score is said squared Euclidean distance between said respective feature maps of said training decoding output and said training regression output, the computation of said regression performance scores comprises said element-wise comparison of said training regression output and some or all of the values of said training decoding output. In an alternative embodiment, the computation of said regression performance scores comprises an element-wise comparison of said training decoding output and said training regression output other than said squared Euclidean distance. In an alternative embodiment, the computation of said regression performance scores comprises the application of one or more similarity measures to some or all values of said training decoding output and some or all values of said training regression output. In an alternative embodiment, the computation of said regression performance scores comprises a post-processing of at least one of said training decoding output and said training regression output, for example zooming both to the same height and width for an element-wise comparison. Additionally, said performance input values of said regression performance measure may comprise values other than said training decoding output and said training regression output without departing from the spirit of the invention.

After the decoding performance measure 308 has been used to compute the decoding performance scores 309 and the regression performance measure 312 has been used to compute the regression performance scores 313, the performance scores computation process 300 is finished. The performance scores computed by said performance scores computation process 300 consist of said decoding performance scores 309 and said regression performance scores 313.

Parameter Adjustment 203

This section describes the parameter adjustment step 203. In the training iteration process 200 depicted in FIG. 2, said parameter adjustment step is referred to as step 203. In the parameter adjustment step 203, some or all of said parameters of said encoder program, said decoder program and said regression program are adjusted to improve some or all of said performance scores 309 and 313 computed for said selected training images 301.

In a preferred embodiment, said parameters are adjusted to minimize a weighted sum of said decoding performance scores and said regression performance scores computed for said training images selected in said training iteration. In a preferred embodiment, said weighted sum is the average of said decoding performance scores and said regression performance scores. In an alternative embodiment, computing said weighted sum comprises the multiplication of each of said performance scores with a respective weight value, for example a weight value specified by the user. In an alternative embodiment, said parameters are adjusted to minimize a weighted sum of thresholded performance scores, where the weight of a performance score depends on one or more thresholds, for example thresholds specified by the user. Additionally, said parameters may be adjusted to minimize or maximize a general non-linear function of said decoding performance scores and said regression performance scores without departing from the spirit of the invention.

In a preferred embodiment, said parameters are adjusted using one or more gradient-based optimization methods, for example stochastic gradient descent. In an alternative embodiment, some or all of said parameters are adjusted using one or more non-gradient-based optimization methods, for example evolutionary optimization algorithms. Additionally, some or all of said parameters may be iteratively adjusted or non-iteratively computed by other optimization algorithms without departing from the spirit of the invention.

In a preferred embodiment, first order derivatives and, if applicable, higher order derivatives required by said gradient-based optimization methods are computed using a back-propagation algorithm, for example as described by LeCun et al. (LECUN, Y. A., et al. Efficient BackProp. In: Neural Networks: Tricks of the Trade: Second Edition. Springer, Berlin, Heidelberg, 2012. pp 9-48). In an alternative embodiment, some or all of said derivates are computed or approximated through numerical differentiation, symbolic differentiation, or automatic differentiation. Additionally, some or all of said derivatives may be computed by other differentiation algorithms without departing from the spirit of the invention.

After some or all of said parameters have been adjusted in the parameter adjustment step 203, the training iteration process 200 is finished. Each training iteration 200 is followed either by another training iteration 200, a search iteration 400 or the acquisition of one or more additional training images 102.

Search Phase

Figure 4:
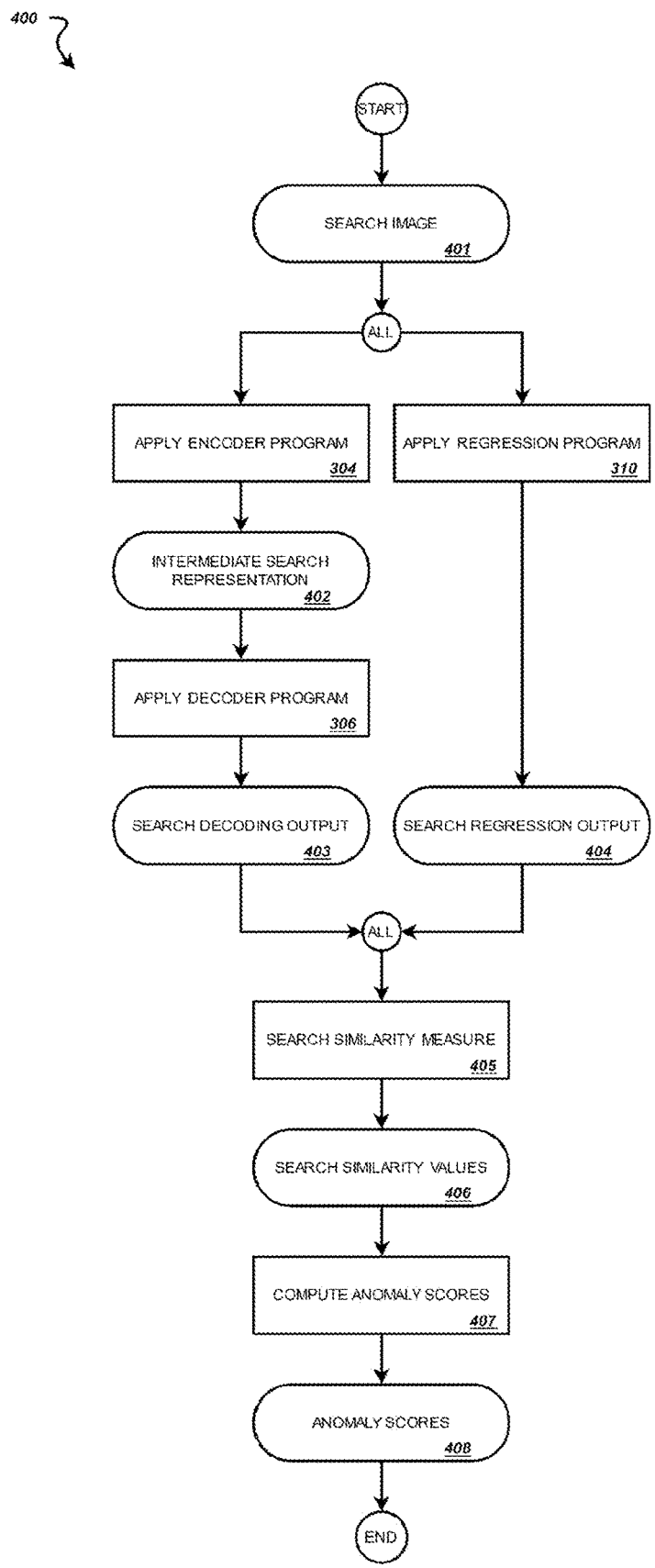
FIG. 4 is a flow diagram of an example search iteration process for computing one or more anomaly scores for a given search image according to an embodiment of the present disclosure.

In the search phase of the method, said encoder program, said decoder program and said regression program that have been trained in the training phase, are used to search anomalies in one or more search images 401 by performing one or more search iterations 400. In the anomaly detection process 100 depicted in FIG. 1, a search iteration is referred to as step 400. FIG. 4 is a flow diagram of an example search iteration process 400 for computing one or more anomaly scores for a given search image 401. Multiple search iteration processes 400 can be performed concurrently by a system of one or more computers located in one or more locations to search anomalies in one or more search images. The steps of a search iteration process 400 are explained in the following sections.

In a preferred embodiment, the first search iteration is performed after the last training iteration. In an alternative embodiment, at least one training iteration 200 is performed after or during a search iteration.

In a preferred embodiment, all search images are 2D grayscale or 2D color images. In an alternative embodiment, some or all of said search images comprise other sensor data obtained, for example, from hyperspectral imaging sensors or depth cameras. In an alternative embodiment, some or all of said search images are 3D images, for example 3D point clouds or 3D voxel grids.

Search Image Augmentation

At the beginning of a search iteration 400, a search image can optionally be augmented. In a preferred embodiment, no search image is augmented. In an alternative embodiment, at least one search image is augmented with at least one of said augmentation methods used in said training phase. In an alternative embodiment, at least one search image is augmented with at least one additional augmentation method that is not used in said training phase. In an alternative embodiment, at least one search image is augmented multiple times, each time with different augmentation methods, different augmentation parameters, or both, resulting in a plurality of augmented search images per search image, for example in order to average the anomaly scores computed for each augmented search image across said augmented search images. In an alternative embodiment, multiple search images are augmented jointly, for example by computing the element-wise average of multiple search images.

Applying the Encoder Program 304

This section describes the step of applying said encoder program 304 to said given search image 401 to compute an intermediate representation, called intermediate search representation 402. In the search iteration process 400 depicted in FIG. 4, applying said encoder program is referred to as step 304, because the same encoder program is used as in step 304 of the performance scores computation 300. In the search iteration process 400 depicted in FIG. 4, said intermediate search representation computed for said given search image 401 is denoted by 402. Formally, the application of said encoder program 304 E to a search image $X^{search}$ can be written as M search $E(X^{search})$ where $M^{search}$ is said intermediate search representation 402.

In a preferred embodiment, said intermediate search representation has the same dimensionality as each of said intermediate training representations. In an alternative embodiment, the dimensionality of at least one intermediate search representation differs from the dimensionality of another intermediate search representation or intermediate training representation.

Applying the Decoder Program 305

This section describes the step of applying said decoder program 305 to said intermediate search representation 402 to compute a search decoding output 403. In the search iteration process 400 depicted in FIG. 4, applying said decoder program is referred to as step 306, because the same decoder program is used as in step 306 of the performance scores computation 300. In the search iteration process 400 depicted in FIG. 4, said search decoding output computed for said given search image 401 is denoted by 403. Formally, the application of said decoder program D to said intermediate search representation $M^{search}$ can be written as $Z^{dec}=D(M^{search})$, where $Z^{dec}$ is said search decoding output.

In a preferred embodiment, said search decoding output is spatially arranged in a collection of feature maps, with the same number $C^{dec}$ of feature maps as each said training decoding output, and each of said feature maps has the same width and height as said search image. In an alternative embodiment, at least one of the width and the height of at least one of said feature maps differs from the respective width and height of said search image. In an alternative embodiment, the number of feature maps of said search decoding output differs from $C^{dec}$. In an alternative embodiment, some or all of the values of said search decoding output are spatially arranged in one or more multi-dimensional grids with more than two dimensions, for example a three-dimensional voxel grid instead of a feature map. In an alternative embodiment, some or all of the values of said search decoding output are spatially arranged in a data structure that is not a grid, for example a 3D point cloud. In an alternative embodiment, said search decoding output comprises one or more values without a spatial correspondence to locations in said search image.

Applying the Regression Program 310

This section describes the step of applying said regression program 310 to said given search image 401 to compute a search regression output 404. In the search iteration process 400 depicted in FIG. 4, applying said regression program is referred to as step 310, because the same regression program is used as in step 310 of the performance scores computation 300. In the search iteration process 400 depicted in FIG. 4, said search regression output computed for said given search image 401 is denoted by 404. Formally, the application of said regression program 310 R to said search image $X^{search}$ can be written as $Z^{reg}=R(X^{search})$, where $Z^{reg}$ is said search regression output 404. In a preferred embodiment, said search regression output is spatially arranged in a collection of feature maps, with the same number Creg of feature maps as each said training regression output, and each of said feature maps has the same width and height as said search image. In an alternative embodiment, at least one of the width and the height of at least one of said feature maps differs from the respective width and height of said search image. In an alternative embodiment, the number of feature maps of said search regression output differs from Creg. In an alternative embodiment, some or all of the values of said search regression output are spatially arranged in one or more multi-dimensional grids with more than two dimensions, for example a three-dimensional voxel grid instead of a feature map. In an alternative embodiment, some or all of the values of said search regression output are spatially arranged in a data structure that is not a grid, for example a 3D point cloud. In an alternative embodiment, said search regression output comprises one or more values without a spatial correspondence to locations in said search image.

Search Similarity Measure 405

This section describes the step of comparing said search regression output 404 with said search decoding output 403 using a similarity measure called search similarity measure 405. The similarity values computed by said search similarity measure are called search similarity values 406. In the search iteration process 400 depicted in FIG. 4, said search similarity measure computation is referred to as step 405 and said search similarity values are denoted by 406. Said search regression output 404 is used as said first collection of values of said search similarity measure 405. Said search decoding output 403 is used as said second collection of values of said search similarity measure 405. In a preferred embodiment, said search similarity measure computes one search similarity value for each pixel position in said search image. In an alternative embodiment, one or more search similarity values computed by said search similarity measure correspond to one or more pixel positions in said search image. In an alternative embodiment, said search similarity measure computes one or more search similarity values without a spatial correspondence to locations in said search image. In an alternative embodiment, said search similarity measure computes a single search similarity value, corresponding to the whole search image or a subset of said search image.

In a preferred embodiment, only the last Creg feature maps of said search decoding output, together with all Creg feature maps of said search regression output, are used for computing said search similarity values. In an alternative embodiment, some or all of said feature maps of said search decoding output and some or all of said feature maps of said search regression output are used for computing said search similarity values. In an alternative embodiment, one or more values in at least one of $Z^{reg}$ and $Z^{dec}$ that are not spatially arranged in a feature map are used for computing said search similarity values.

In a preferred embodiment, said search similarity measure computes squared per-pixel-position Euclidean distances between said search regression output and said respective feature maps of said search decoding output. Said computation of said search similarity value, formally denoted by $S_p$, at each pixel position p in said respective search image $X^{search}$ as said squared Euclidean distance between said search regression output $Z^{reg}$ at p and said respective feature maps of said search decoding output $Z^{dec}$ at p can formally be written as $$S_p = \sum_{c=1}^{C^{reg}} \left(Z^{reg}_{c,p} - Z^{dec}_{C^{target}+c,p}\right)^2,$$

where c denotes the index of a feature map, $Z_{c,p}^{reg}$ denotes the value of $Z^{reg}$ in the feature map with index c at a pixel position p, and $Z_{C^{target}+c,p}^{dec}$ denotes the value of $Z^{dec}$ in the feature map whose index is the sum of $C^{target}$ and c, at a pixel position p. In an alternative embodiment, the computation of said search similarity values comprises an element-wise comparison of said search regression output and some or all of the values of said search decoding output, in particular said element-wise comparison comprises computing said squared per-pixel-position Euclidean distances according to said computational method. Consequently, when said search similarity values are said squared per-pixel-position Euclidean distances between said respective feature maps of said search decoding output and said search regression output, the computation of said search similarity values comprises said element-wise comparison of said search regression output and some or all of the values of said search decoding output. In a yet alternative embodiment, the computation of said search similarity values comprises, for each pixel position in said search image, an element-wise comparison of said search decoding output and said search regression output other than said squared Euclidean distance. In an alternative embodiment, the computation of said search similarity values comprises the application of one or more similarity measures to some or all values of said search decoding output and some or all values of said search regression output. In an alternative embodiment, the computation of said search similarity values comprises a post-processing of at least one of said search decoding output and said search regression output, for example zooming both to the same height and width for an element-wise comparison.

Computing Anomaly Scores 408

This section describes the step of computing one or more anomaly scores 408 for said search image 401 based on said search similarity values 406. In the search iteration process 400 depicted in FIG. 4, said anomaly score computation is referred to as step 407 and said computed anomaly scores are denoted by 408.

In a preferred embodiment, one regional anomaly score is computed for each pixel position in said search image, with all regional anomaly scores forming one anomaly map with the same height and width as said search image. In alternative embodiments, for at least one search image, zero or more image anomaly scores and zero or more regional anomaly scores are computed, as described above.

In a preferred embodiment, each regional anomaly score is computed based on the respective search similarity value computed by said search similarity measure for the respective pixel position in said search image. In a preferred embodiment, said computation of said regional anomaly scores comprises an element-wise affine transformation of said search similarity values computed for said search image. In said element-wise affine transformation, the scaling value and the shifting value are set to values that normalize said regional anomaly scores to follow a standard normal distribution. In a preferred embodiment, each regional anomaly score is then given by said transformed search similarity value at the respective pixel position after said element-wise affine transformation of said search similarity values. In an alternative embodiment, said scaling value and shifting value are set to values that normalize some or all of said regional anomaly scores to follow a probability distribution other than a standard normal distribution. In an alternative embodiment, some or all of said regional anomaly scores are given by said search similarity values at the respective pixel position without said search similarity values being transformed by an element-wise affine transformation. In an alternative embodiment, some or all of said regional anomaly scores are given by transformed search similarity values at the respective pixel position after said search similarity values are transformed by a non-linear function. In an alternative embodiment, one or more regional anomaly scores are computed by combining multiple search similarity values. In an alternative embodiment, one or more regional anomaly scores correspond to multiple pixel positions in said search image. Additionally, some or all of said regional anomaly scores may be computed by a linear or non-linear function based on some or all of said search similarity values without departing from the spirit of the invention.

After the anomaly scores 408 have been computed in step 407, the search iteration process 400 is finished. In the anomaly detection process 100 depicted in FIG. 1, each search iteration 200 is followed either by another search iteration 400, a training iteration 200, the acquisition of one or more additional training images 102, or the end of said anomaly detection process 100.

Combining Anomaly Detection Programs

Said anomaly scores 408 may be combined with one or more other anomaly scores, called second anomaly scores, computed by additionally applying at least one anomaly detection program, called second anomaly detection program, to said search image 401. For example, said second anomaly detection program can be said Student-Teacher method proposed by Bergmann et al. (BERGMANN, P., et al. Uninformed Students: Student-Teacher Anomaly Detection With Discriminative Latent Embeddings. In: Proceedings of the IEEE/CVF Conference on Computer Vision and Pattern Recognition (CVPR), 2020. pp 4183-4192). In a preferred embodiment, said anomaly scores 408 are not combined with other anomaly scores. In an alternative embodiment, said anomaly scores 408 comprise regional anomaly scores that are spatially arranged, forming one or more anomaly maps, called first anomaly maps, and said first anomaly maps are combined with one or more second anomaly maps computed by at least one second anomaly detection program. In said combination of first and second anomaly maps, said first and second anomaly maps are transformed by one or more transformations, for example an element-wise affine transformation, prior to said combination of first and second anomaly maps. Said transformations may include the identity function, which does not modify the anomaly map to which it is applied. Said combination of first and second anomaly maps is then performed by summing some or all of said first and second transformed anomaly maps to form at least one summed anomaly map, wherein at least one anomaly score in said summed anomaly map is the sum of anomaly scores from said first and second transformed anomaly maps. In an alternative embodiment, said anomaly scores 408 are combined with one or more second anomaly scores computed by one or more second anomaly detection programs and the presence of anomalies is determined based on some or all of the values of said anomaly scores 408 and some or all of the values of said second anomaly scores.

The presented method introduces multiple inventions to extend the state-of-the-art in anomaly detection. In contrast to many successful anomaly detection methods that harness features extracted from pretrained networks, such as said Student-Teacher method, the presented method makes use of pretrained networks without being limited by the size of receptive fields. Furthermore, said pretrained networks are not required during said search phase. In the search phase, only the encoder, decoder and regression programs are required. This is a key advantage over approaches like said Student-Teacher method, which require applying a pretrained network to each search image. To achieve a strong anomaly detection, pretrained networks often need to be expressive and thus computationally expensive. The encoder, decoder, and regression programs, on the other hand, can be designed to fit the requirements of the respective application.

There are numerous anomaly detection methods that analyze the search image as a whole and are not limited by receptive fields, i.e., non-local methods, such as said autoencoder-based MNAD method or said f-AnoGAN method. However, these methods are often outperformed by the aforementioned methods based on pretrained networks. The presented method counteracts multiple central shortcomings of current non-local methods. One innovative aspect is that said regression network avoids false positives caused by inaccurate predictions of said decoder network. For instance, when said target representation consists of said search image itself or of features from a pretrained network, it is difficult for said decoder network to reconstruct said target representation accurately through the bottleneck given by said lower-dimensional intermediate representation. Said regression network can compensate this by learning to output similarly inaccurate feature maps, for example by also generating blurry reconstructions if said decoder network computes blurry reconstructions. This remedies a key disadvantage of autoencoders, which suffer from false positives caused by comparing inaccurate reconstructions with the input image. Another innovative aspect is that input images are reconstructed through a lower-dimensional intermediate representation to match a target representation, which does not necessarily have to be the input image itself. Said target representation may be a descriptive annotation or, preferably, the output of a pretrained network. Thus, anomalies can be detected in an expressive, learned feature space by comparing reconstructed features of regions, instead of only pixels, in the input image.

An exemplary anomaly detection task for which the invention can be used is the detection of defects in screws. In said task, each search image may show one screw, and said defects may comprise scratches, dents, and irregular screw lengths. For example, a screw may be required to be at least 4.9 cm long and at most 5.1 cm long. Patch-based approaches like said Student-Teacher method may succeed in the detection of scratches and dents. However, they may fail to detect defects that are not confined to the receptive field of the anomaly detection method. For example, a screw that is 6 cm long may not be considered anomalous by a Student-Teacher method operating on patches that are 1 cm wide and 1 cm tall. That is because each patch, when being examined in isolation, may not show anomalous patterns. The present invention may successfully detect all said defects, as it is not limited by receptive fields. Other anomaly detection methods that are not limited by receptive fields either, such as autoencoders or GAN-based approaches, may succeed in the detection of irregular screw lengths, but may falsely identify anomaly-free images as being anomalous due to inaccurate reconstructions. For example, an autoencoder may fail to accurately reconstruct the thread of a screw and thus falsely detect an anomaly. The present invention avoids this issue through the use of a regression network.

Another exemplary anomaly detection task for which the invention can be used is the detection of defects in water bottles. In said task, each search image may show one glass bottle, and said defects may comprise contaminations inside the bottle and irregular fill levels. For example, a bottle may be required to contain between 990 ml and 1010 ml of water. A possible anomaly detection approach may be to obtain defect-free and anomalous training images. A human annotator may then label each training image based on the following classes: "contamination", "irregular fill level" and "no defect". However, there may be many different possible contaminations, making it difficult to determine all possible types of contaminations in advance and to obtain training images of each contamination type. During a search phase, this approach may thus fail to detect types of contaminations that were not included in the obtained training images. The present invention may successfully detect all said defects, as it does not require anomalies to be annotated or present in the training images. Patch-based methods like said Student-Teacher method may fail to detect irregular fill levels, depending on the size of the method's receptive field. Autoencoders and GAN-based methods may fail to accurately reconstruct refraction patterns in the glass of defect-free bottles, causing false-positive predictions. The present invention may successfully detect all said defects, as it is not limited by receptive fields and avoids false-positive predictions through the use of a regression network.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The invention claimed is:

1. A computer implemented method for detecting anomalies in digital images using at least one machine learning program, comprising the steps of:
    (a) acquiring one or more training images;
    (b) training said method on said training images by performing at least one training iteration, each training iteration comprising the steps of:
        (b1) selecting one or more images from said training images;
        (b2) computing a plurality of performance scores for each selected training image, comprising the steps of:
            (b21) obtaining a target representation for said selected training image, wherein, for at least one training image, said target representation comprises either i) some or all of the output values of a neural network when applying said neural network to said training image, or ii) one or more annotation values;
            (b22) instructing an encoder program to compute an intermediate training representation of lower dimensionality than said selected training image by applying said encoder program to said selected training image;
            (b23) instructing a decoder program to compute a training decoding output of higher dimensionality than said intermediate training representation by applying said decoder program to said intermediate training representation;
            (b24) computing one or more decoding performance scores based on said training decoding output and said target representation of said selected training image;
            (b25) instructing a regression program to compute a training regression output by applying said regression program only to said selected training image, without using any decoding output as an input;
            (b26) computing one or more regression performance scores based on said training regression output and said training decoding output for said selected training image;
        (b3) adjusting one or more parameters of said machine learning programs to improve said performance scores for said selected training images;
    (c) acquiring one or more search images;
    (d) detecting anomalies in said search images, for each search image, comprising the steps of:
        (d1) instructing said encoder program to compute an intermediate search representation of lower dimensionality than said search image by applying said encoder program to said search image;

(d2) instructing said decoder program to compute a search decoding output of higher dimensionality than said intermediate search representation by applying said decoder program to said intermediate search representation;

(d3) instructing said regression program to compute a search regression output by applying said regression program only to said search image, without using any decoding output as an input;

(d4) applying a search similarity measure that compares said search regression output and said search decoding output for said search image to compute one or more search similarity values; and (d5) computing one or more anomaly scores for said search image based on said search similarity values.

2. The method of claim 1, wherein said anomaly scores computed in step (d5) are combined with one or more second anomaly scores computed by at least one second anomaly detection program and the presence of anomalies is determined based on some or all of the values of said anomaly scores computed in step (d5) and some or all of the values of said second anomaly scores.

3. The method of claim 1, wherein some or all of said computed anomaly scores, either computed by a first anomaly detection program alone or combined with one or more second anomaly scores computed by at least one second anomaly detection program, are spatially arranged, forming one or more anomaly maps for some or all of said search images.

4. The method of claim 3, wherein some or all of said anomaly maps are combined with one or more anomaly maps computed by at least one second anomaly detection program, comprising the steps of:

(e1) obtaining one or more anomaly maps in step (d5) as first anomaly maps;

(e2) computing one or more second anomaly maps by applying at least one second anomaly detection program to said search image;

(e3) applying one or more transformations to said first and second anomaly maps;

(e4) summing some or all of said first and second transformed anomaly maps to form at least one summed anomaly map, wherein at least one anomaly score in said summed anomaly map is the sum of anomaly scores from said first and second transformed anomaly maps.

5. The method of claim 1, wherein, for at least one training image, said target representation comprises some or all of the values of said training image.

6. The method of claim 1, wherein at least one of said encoder program, decoder program, and regression program is a convolutional neural network.

7. The method of claim 1, wherein, for at least one training image, the computation of at least one of said decoding performance scores comprises an element-wise comparison of said target representation with some or all of the values of said training decoding output.

8. The method of claim 7, wherein, for at least one training image, one of said decoding performance scores is the squared Euclidean distance between said obtained target representation and some or all of the values of said training decoding output.

9. The method of claim 1, wherein, for at least one training image, the computation of at least one of said regression performance scores comprises an element-wise comparison of said training regression output with some or all of the values of said training decoding output.

10. The method of claim 9, wherein, for at least one training image, one of said regression performance scores is the squared Euclidean distance between said training regression output and some or all of the values of said training decoding output.

11. The method of claim 1, wherein, for at least one search image, said search similarity measure computes one or more squared per-pixel-position Euclidean distances between said search regression output and some or all of the values of said search decoding output.

12. The method of claim 1, wherein one of or both of said encoder program and said decoder program are trained on one or more training images before the parameter adjustment of said regression program in step (b3).

13. The method of claim 1, wherein at least one of said training images is augmented using at least one augmentation method and at least one of said encoder program and said decoder program is applied to at least one of said augmented training images.

14. A system comprising a processor, wherein the processor is configured to execute the computer implemented method for detecting anomalies in digital images according to the method of claim 1.

* * * * *